United States Patent
Tamura et al.

(10) Patent No.: US 6,844,997 B2
(45) Date of Patent: Jan. 18, 2005

(54) HEAD FEEDING MECHANISM HAVING PROTRUSION ENGAGED WITH LEAD SCREW

(75) Inventors: Kazuya Tamura, Isehara (JP); Yoshinori Tangi, Hachiouji (JP); Eiichi Yoneyama, Atsugi (JP); Hiromi Inoguchi, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 27 days.

(21) Appl. No.: 10/325,151

(22) Filed: Dec. 20, 2002

(65) Prior Publication Data
US 2003/0123195 A1 Jul. 3, 2003

(30) Foreign Application Priority Data
Dec. 28, 2001 (JP) ........................................ 2001-399124

(51) Int. Cl.[7] .............................................. G11B 21/08
(52) U.S. Cl. ..................................................... 360/261.3
(58) Field of Search ...................................... 360/261.3

(56) References Cited

U.S. PATENT DOCUMENTS

| | | | |
|---|---|---|---|
| 5,414,585 A | | 5/1995 | Saliba |
| 5,448,438 A | * | 9/1995 | Kasetty .................... 360/261.3 |
| 5,706,149 A | * | 1/1998 | Hoelsaeter ............... 360/261.3 |
| 5,793,574 A | | 8/1998 | Cranson et al. |
| 5,812,347 A | * | 9/1998 | Henke ...................... 360/261.3 |
| 5,857,634 A | | 1/1999 | Hertrich |
| 5,862,014 A | | 1/1999 | Nute |
| 6,061,209 A | * | 5/2000 | Stephens et al. .......... 360/261.3 |
| 6,157,516 A | * | 12/2000 | Hertrich et al. ............. 360/128 |
| 6,241,171 B1 | | 6/2001 | Gaboury |
| 6,556,385 B2 | * | 4/2003 | Nawa ....................... 360/261.3 |
| 6,697,229 B2 | * | 2/2004 | Tamura et al. ............ 360/261.3 |

FOREIGN PATENT DOCUMENTS

| | | |
|---|---|---|
| JP | 2000-100025 A | 4/2000 |
| JP | 2000-100116 A | 4/2000 |
| JP | 2000-149491 A | 5/2000 |
| WO | WO 86/07295 A1 | 12/1986 |
| WO | WO 86/07471 A1 | 12/1986 |

* cited by examiner

*Primary Examiner*—David Davis
(74) *Attorney, Agent, or Firm*—Frishauf, Holtz, Goodman & Chick, P.C.

(57) ABSTRACT

In the engaging structure of a lead screw (51) with a head lift body (52), for simplification of a feeding side mechanism and improvement of feeding accuracy, the head lift body has only one fingernail shaped protrusion (551) as a member engaging with an external thread of the lead screw (51). The protrusion (551) is provided on an internal wall surface of a bearing portion (55) formed in an integral structure with the head lift body (52). Accordingly, the engagement of the external thread of the lead screw and the single protrusion converts the rotation movement of the lead screw (51) to the linear movement of the head lift body (52). As a result, a feeding accuracy in the linear movement converted from the rotation movement is only determined by a feeding accuracy of only the lead screw (51). In an example, the protrusion is a half-moon shaped plate.

9 Claims, 8 Drawing Sheets

HEAD FEEDING MECHANISM HAVING PROTRUSION ENGAGED WITH LEAD SCREW

This application claims priority to prior application JP 2001-399124, the disclosure of which is incorporated herein by reference.

BACKGROUND OF THE INVENTION

This invention relates to a head feeding mechanism of a magnetic head actuator assembly for use in a linear magnetic tape storage system represented by a DLT (digital linear tape) or an LTO (linear tape open) and, in particular, to a head feeding mechanism capable of simplification of a shape form in the feeding side and improvement of the feeding accuracy thereof.

A linear magnetic tape storage system (magnetic recording/reproducing apparatus) of the type has been developed as a backup for a memory device (e.g. a hard disk) of a computer system. Various types of linear magnetic tape storage systems have already been proposed. For example, a digital linear tape drive as a DLT is disclosed in U.S. Pat. No. 5,862,014.

The digital linear tape drive (which may simply be called "tape drive") is adapted to receive a tape cartridge having a single reel (supply reel) and contains a take-up reel in the interior thereof. When the tape cartridge is loaded in the tape drive, a magnetic tape is pulled out of the tape cartridge and taken up by the take-up reel through a head guide assembly (HGA). The head guide assembly serves to guide the magnetic tape pulled out of the tape cartridge to a magnetic head. The magnetic head exchanges information between the magnetic tape and the magnetic head. The head guide assembly generally comprises a boomerang-shaped aluminum plate and six large guide rollers each of which comprises a bearing.

The head guide assembly is also called a tape guide assembly and is disclosed, for example, in U.S. Pat. No. 5,414,585. An example of the guide roller is disclosed in Japanese Unexamined Patent Publication No. 2000-100025 (JP 2000-100025 A).

As disclosed, for example, in U.S. Pat. No. 5,793,574, the tape drive is generally comprised of a rectangular housing that has a common base. The base has two spindle motors (reel motors). The first spindle motor has a spool (take-up reel) permanently mounted on the base. The spool is dimensioned to accept a relatively high speed streaming magnetic tape. The second spindle motor (reel motor) is adapted to accept a removable tape cartridge. The removable tape cartridge is manually or automatically inserted into the drive via a slot formed on the drive's housing. Upon insertion of the tape cartridge into the slot, the tape cartridge engages with the second spindle motor (reel motor).

Prior to rotation of the first and the second spindle motors, the tape cartridge is connected to the permanently mounted spool (take up reel) by means of a mechanical buckling mechanism. A number of rollers (guide rollers) are positioned intermediately between the tape cartridge and the permanently mounted spool, and guide the magnetic tape as it traverses at relatively high speeds back and forth between the tape cartridge arid the permanently mounted spool.

The digital linear tape drive having the above-mentioned structure requires a pulling apparatus for pulling the magnetic tape from the supply reel to the take-up reel. Such a pulling apparatus is disclosed, for example, in International Publication No. WO 86/07471. According to WO 86/07471, take up leader means (first tape leader) is coupled to the take-up reel while supply tape leader means (second tape leader) is fixed to the tape on the supply reel. The first tape leader has a mushroom-like tab formed at its one end. The second tape leader has a locking hole. The tab is engaged with the locking hole.

Furthermore, a mechanism for joining the first tape leader to the second tape leader is required. Such a joining mechanism is disclosed, for example, in International Publication No. WO 86/07295.

Japanese Unexamined Patent Publication No. 2000-100116 (JP 2000-100116 A) discloses "Structure of Leader Tape Engaging Part". In this structure, an end of a leader tape (second tape leader) can be locked to a tape end hooking part of a tape cartridge without requiring a tab projecting on a lateral side of the leader tape.

U.S. Pat. No. 5,857,634 discloses a locking system for preventing the rotation of a take-up reel of a tape drive when a tape cartridge is not inserted into the drive.

On the other hand, an example of the tape cartridge to be received in the digital linear tape drive is disclosed in Japanese Unexamined Patent Publication No. 2000-149491 (JP 2000-149491 A).

U.S. Pat. No. 6,241,171 discloses a tape drive in which a tape leader can be urged from a tape cartridge through a tape path to a take-up reel without using a buckling mechanism or a take-up leader.

The tape drive further comprises a magnetic tape head actuator assembly. The magnetic tape head actuator assembly is positioned between the take-up spool and the tape cartridge along a tape path defined by a plurality of rollers. During operation, the magnetic tape streams back and forth between the take-up spool and the tape cartridge, coming into close proximity to the magnetic head actuator assembly while streaming along the defined tape path. An example of such a magnetic tape head actuator assembly is disclosed in the above-mentioned U.S. Pat. No. 5,793,574.

Figure 1:
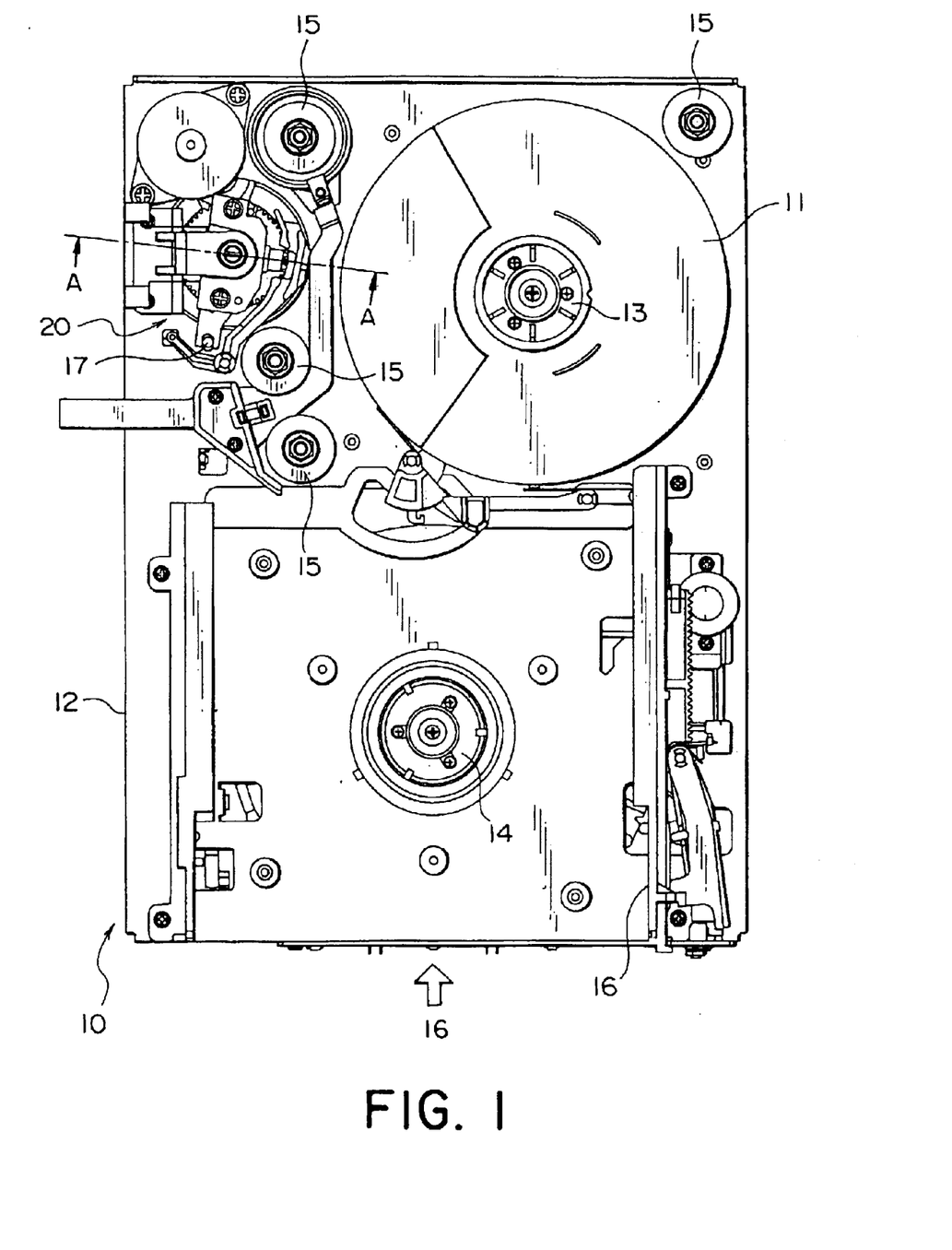
FIG. 1 is a plan view showing a typical tape drive in the state where a top cover is removed.

Referring to FIG. 1, description will be made of the structure of a typical tape drive comprising a magnetic head actuator assembly. FIG. 1 is a plan view of the tape drive in the state where an upper cover is removed.

The tape drive 10 is adapted to receive a removable tape cartridge (not shown) and includes a take-up reel 11 in the interior thereof. The take-up reel 11 may be called a spool. The tape drive 10 comprises a generally rectangular housing (gear chassis) 12 having a common base. The base of the housing 12 has two spindle motors (reel motors) 13 and 14. The first spindle motor 13 has the take-up reel 11 permanently mounted to the base. The take-up reel 11 is dimensioned so as to accept a magnetic tape (not shown) streaming at a relatively high speed. The second spindle motor 14 is adapted to receive the removable tape cartridge. The removable tape cartridge is manually or automatically inserted into the tape drive 10 via a slot 16 formed on the housing 12 of the tape drive 10 along the extending direction of the slot 16.

When the tape cartridge is inserted into the slot 16, the cartridge is engaged with the second spindle motor 14. Prior to rotation of the first and the second spindle motors 13 and 14, the tape cartridge is connected to the permanently mounted take-up reel 11 by means of a mechanical buckling mechanism. A number of rollers (guide rollers) 15 are positioned between the tape cartridge and the take-up reel 11 and guide the magnetic tape as it streams at a relatively high speed back and forth between the tape cartridge and the permanently mounted take-up reel 11.

The housing 12 is made of aluminum die-casting, which is a non-magnetic material. Accordingly, the second spindle motor 14 is covered with a plate of an iron-based magnetic material in order to inhibit magnetic leakage from a magnet (not shown) of the second spindle motor 14.

The tape drive 10 further comprises a magnetic tape head actuator assembly (hereinafter may be simply called "actuator assembly") 20. The actuator assembly 20 is positioned between the take-up reel 11 and the tape cartridge along a tape path (not shown) defined by the rollers 15. During operation, the magnetic tape streams back and forth between the take-up reel 11 and the tape cartridge, coming into close proximity to the actuator assembly 20 while streaming along the defined tape path.

Figure 2:
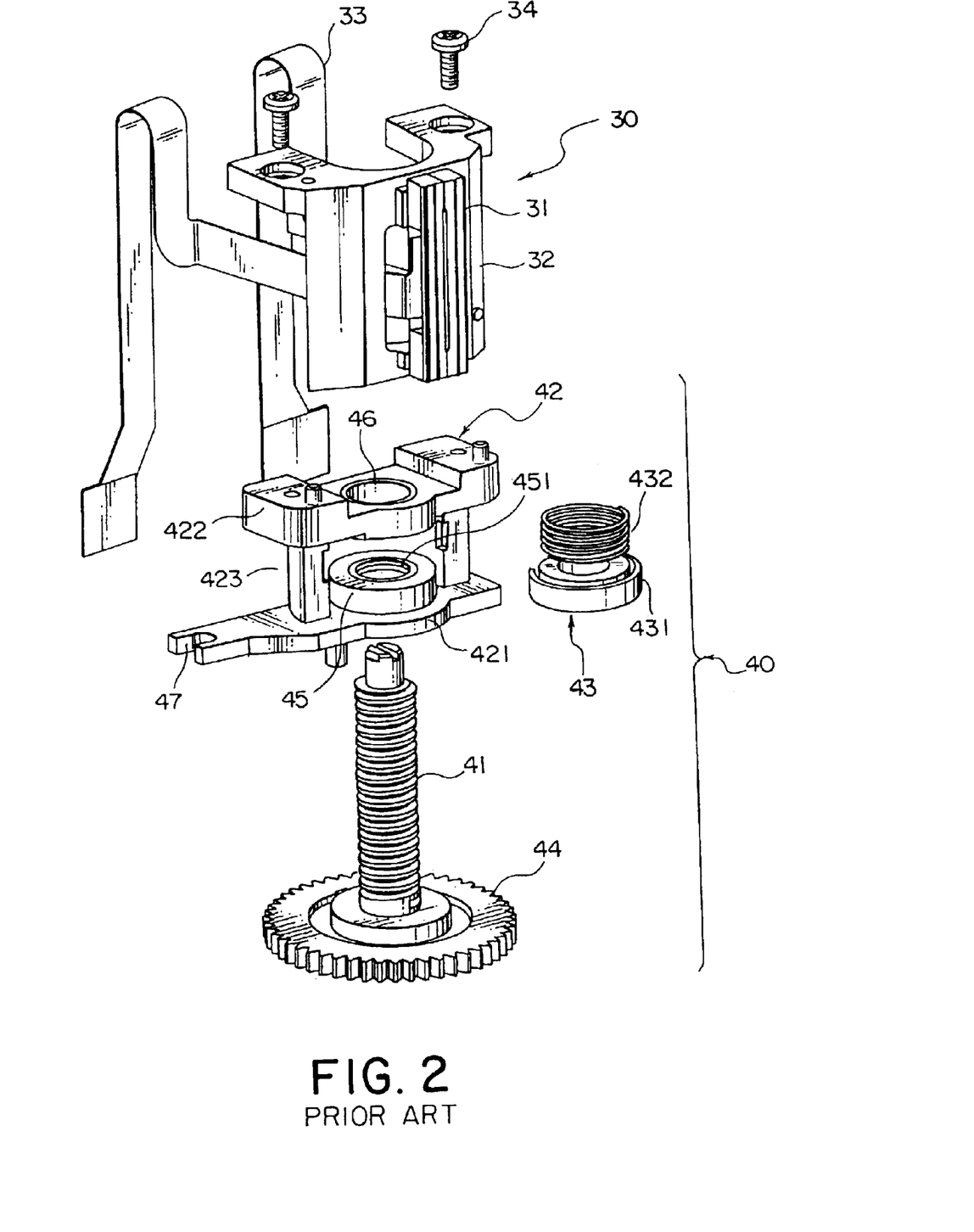
FIG. 2 is an exploded perspective view of an existing magnetic head actuator assembly.

Next, referring to FIGS. 1 and 2, description will be made of an outline of the actuator assembly 20. As shown in FIG. 2, the actuator assembly 20 comprises the head assembly 30 and the head feeding mechanism 40. And the head feeding mechanism 40 comprises a rotation portion and a linear movement portion moving up and down in a direction of a rotation axis of the rotation portion.

The actuator assembly 20 is disposed on the base of the housing 12 and has a magnetic head assembly 30 moving along and in proximity of a magnetic tape surface. On the base of the housing 12, a guide bar 17 is fixedly mounted to guide the magnetic head assembly 30 moving up and down linearly in a vertical direction or a direction perpendicular to the base of the housing 12.

The magnetic head assembly 30 comprises a magnetic head 31 extending in the vertical direction, a head holder 32 holding the magnetic head 31 on its one side surface (hereinafter may be called "front surface"), and a pair of flexible printed circuits (hereinafter may be abbreviated to "FPC") 33. The FPCs 33 extend at the opposite side surface (hereinafter may be called "rear surface") to electrically connect the magnetic head 31 and an external circuit (not shown). By screwing screws 34 to a head lift body 42 of the head feeding mechanism 40 through the screw holes, the head assembly 30 is coupled to the head lift body 42 of the head feeding mechanism 40.

On the rear side of the head holder 32, the head feeding mechanism 40 is disposed with a lead screw 41 having a screw center axis as a rotation center axis extending in the vertical direction. The head lift body 42 is engaged with the lead screw 41 and moves up and down together with the head assembly 30 following the rotation of the lead screw 41.

Next, description will be made of the head feeding mechanism 40 shown in FIG. 2.

The head feeding mechanism 40 comprises the lead screw 41 with an external thread, the head lift body 42, and a backlash preventing mechanism 43 for preventing the backlash of the actuator assembly 20.

The lead screw 41 has a rotation center axis extending in the vertical direction and is provided with a lead screw gear 44 attached to a lower end thereof. The lead screw gear 44 serves to rotate the lead screw 41 around the rotation center axis when it is driven by a driving machine (not shown). The head lift body 42 moves up and down along the rotation center axis following the rotation of the lead screw 41 around the rotation center axis.

The head lift body 42 comprises a base portion 421, a ceiling portion 422, and a semi-cylindrical portion 423. The base portion 421 and the ceiling portion 422 extend substantially in parallel to each other and are spaced in the vertical direction and connected to each other by the semi-cylindrical portion 423. The semi-cylindrical portion 423 has an upright gutter-like shape as a half-split cylinder, which is taken by cutting a hollow cylinder by a plane along the center axis thereof. Accordingly, the head lift body 42 has a generally "I" shape as seen from a lateral side. The head lift body 42 holds the head assembly 30 and moves up and down together with the head assembly 30. In the head lift body 42, the backlash preventing mechanism 43 is arranged inside of the hollow opening of the semi-cylindrical portion 423.

The backlash preventing mechanism 43 includes a pre-load bushing 431 and a pre-load spring 432 of a compression coil spring. The pre-load bushing 431 has an internal thread to be engaged with the external thread of the lead screw 41 when the pre-load bushing 431 is located in the hollow opening of the semi-cylindrical portion 423. The pre-load spring 432 is disposed in a compressed state between the head lift body 42 and the pre-load bushing 431.

The lead screw gear 44 is fixed to the lower end of the lead screw 41 and serves to rotate the lead screw 41 around the rotation center axis when it is driven by a driving machine (not shown). The lead screw 41 is engaged with an internal thread 451 of a nut 45 mounted on the head lift body 42. Accordingly, the rotation of the lead screw 41 around the rotation center axis thereof moves the head lift body 42 in the vertical direction coincident with the extending direction of the rotation center axis, in cooperation with the pre-load bushing 431.

Next, description will be made of the structure of the head lift body 42 more in detail.

The head lift body 42 includes the nut 45, which has the internal thread 451 to be engaged with the lead screw 41, a plain or sliding bearing 46 (will later be described), and a guide portion 47 (will later be described).

Figure 3:
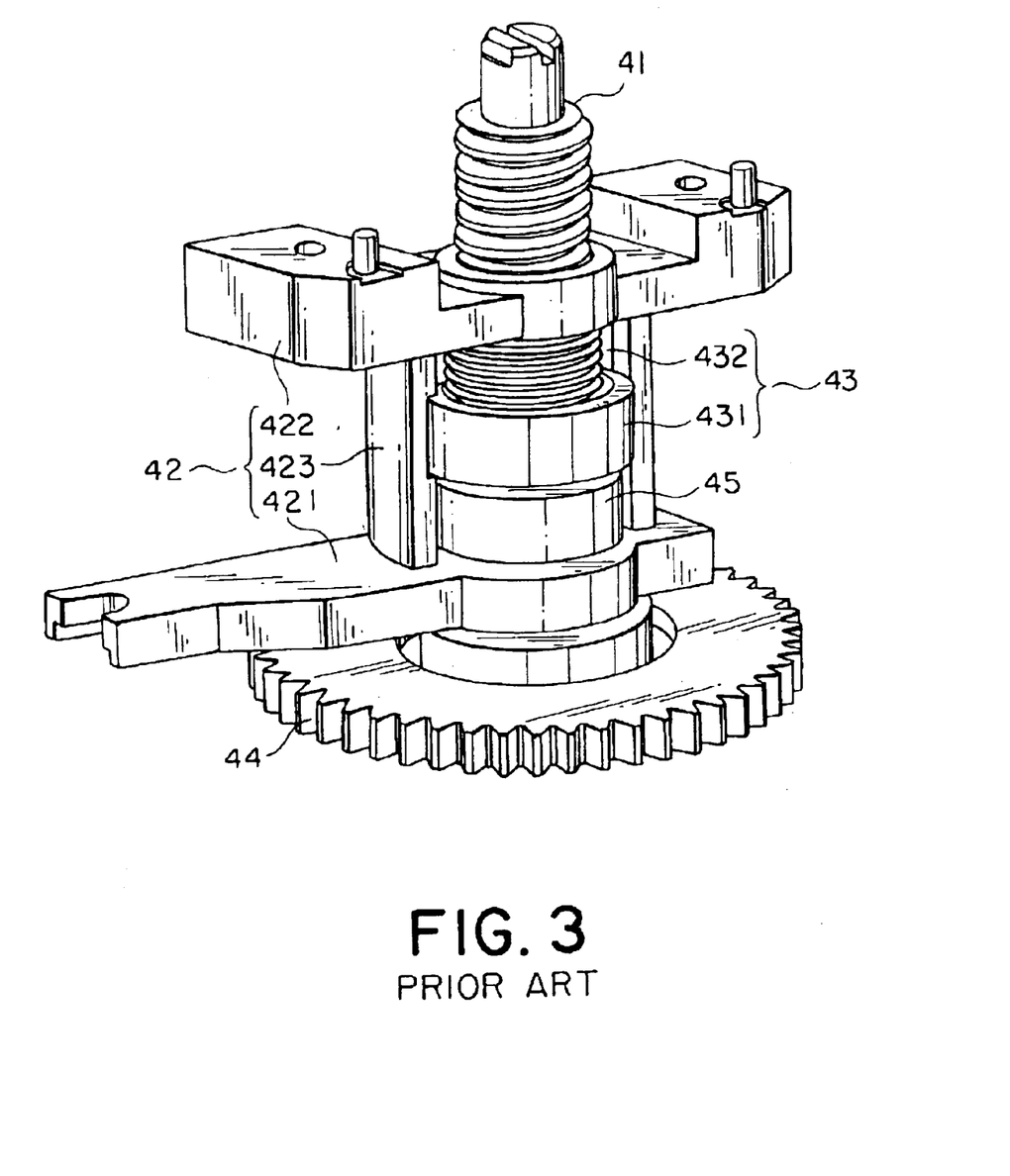
FIG. 3 is a perspective view of a head feeding mechanism, in an assembled state, illustrated in FIG. 2.

As described above, the head lift body 42 has a main portion composed of the base portion 421 defining a lower end surface, the ceiling portion 422 defining an upper end surface, and the semi-cylindrical portion 423 with the hollow opening. Each of the base portion 421 and the ceiling portion 422 has a pair of peaks extending outward from opposite sides of the semi-cylindrical portion 423. As seen in a direction perpendicular to the extending direction of the peaks, i.e., as seen from the lateral side, the head lift body 42 has a generally "I" shape. The base portion 421 and the ceiling portion 422 have circular openings formed at positions corresponding to the hollow opening of the semi-cylindrical portion 423 to form the plain or sliding bearings 46, respectively, which receive the lead screw 41 inserted therethrough.

At the position of the above-mentioned circular opening to receive the lead screw 41 inserted therethrough and in the hollow opening of the semi-cylindrical portion 423, the base portion 421 is provided with the nut 45 having the internal thread 451 to be engaged with the lead screw 41. In the figure, the nut 45 is fixedly mounted on the upper surface of the base portion 421 in the hollow opening of the semi-cylindrical portion 423. Alternatively, the nut 45 may be integrally molded, for example, embedded in the base portion 421 at that position.

One of the peaks of the base portion 421 laterally extends as an arm to the length longer than the other peak and has the guide portion 47 of a generally "U" shape at its end. The guide portion 47 is fitted and attached to the guide bar 17 illustrated in FIG. 1 so as to be slidable in the vertical direction. The guide portion 47 serves to prevent the rotation of the head lift body 42 around the rotation central axis.

The ceiling portion 422 has a pair of screw holes in its peaks engaged with the screws 34, respectively. By screwing the screws 34 into the screw holes, the head assembly 30 is fixed to the head lift body 42. The hollow opening of the semi-cylindrical portion 423 serves to receive the backlash preventing mechanism 43 comprising the pre-load bushing 431 and the pre-load spring 432.

That is, the backlash preventing mechanism 43 comprises a combination of the pre-load bushing 431 and the pre-load spring 432, and serves to prevent backlash of the actuator assembly 20.

Figure 4:
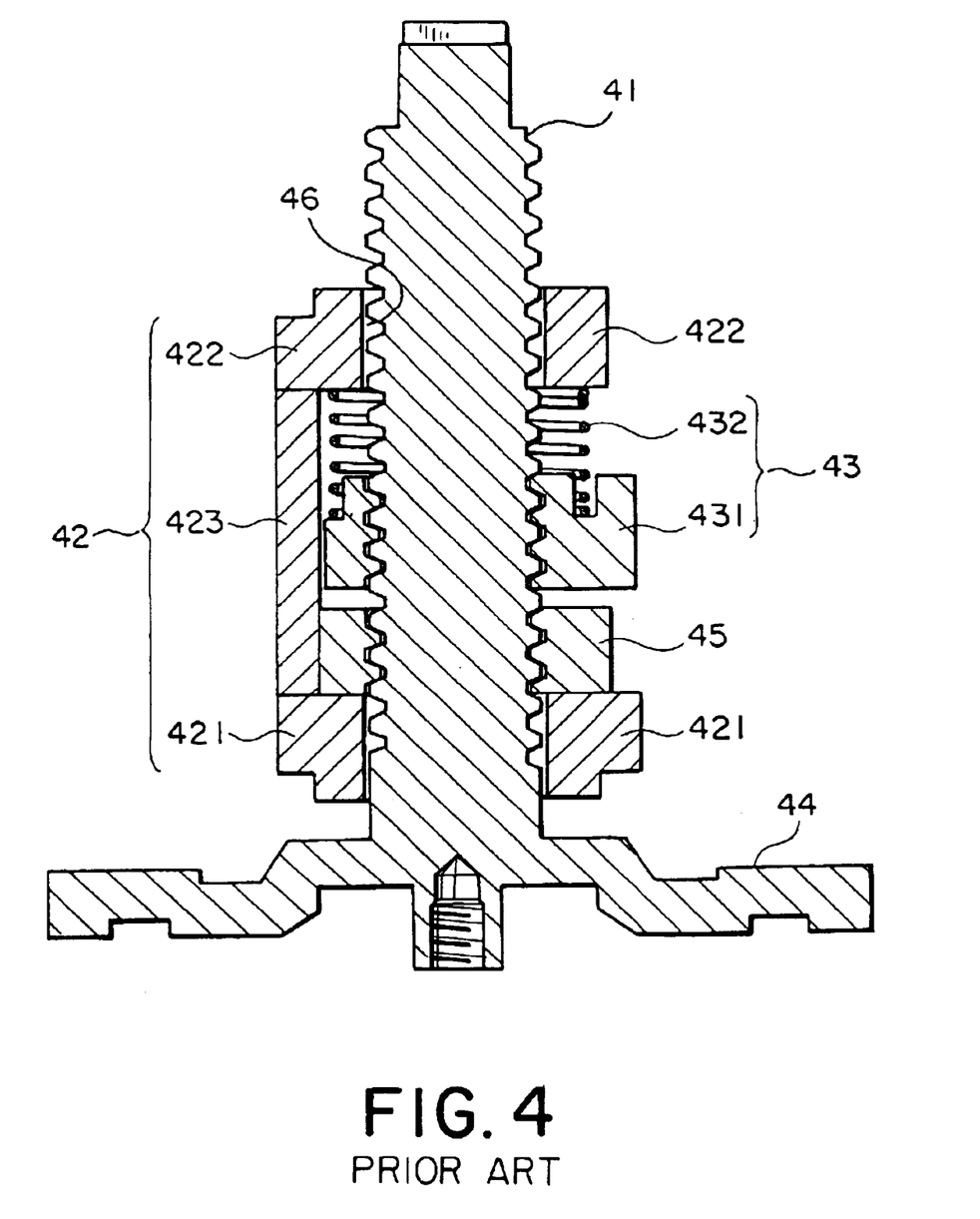
FIG. 4 is a sectional view of the head feeding mechanism illustrated in FIG. 3, taken along a line A—A in FIG. 1.

The pre-load bushing 431 comprises a cylindrical portion with an internal thread formed on its inside surface, an external annular receiving portion, and a semi-cylindrical wall portion. The external annular receiving portion extends radially outward at the lower end of the cylindrical portion to serve as a stopper for the pre-load spring 432. The semi-cylindrical wall portion extends upward from an outer periphery of the receiving portion in an area corresponding to an approximately half circle. Accordingly, a semi-annular gap is formed between the cylindrical portion and the semi-cylindrical portion. As shown in FIG. 4, the pre-load spring 432 is partially received in the semi-annular gap and is disposed in a compressed state between the annular receiving portion of the pre-load bushing 431 and the lower surface of the ceiling portion 422 of the head lift body 42. Furthermore, both ends of the semi-cylindrical wall portion of the pre-load bushing 431 inhibit the rotation of the pre-load bushing 431 by engagement with edges of the semi-cylindrical portion 423 when the pre-load bushing 431 is mounted into the head feeding mechanism 40.

The pre-load spring 432 is a compression coil spring. By mounting the pre-load spring 432, the pre-load bushing 431 is continuously applied with a downward pressing force along the rotation center axis of the lead screw 41, while the head lift body 42 is continuously applied with an upward pressing force along the rotation center axis of the lead screw 41. As the guide portion 47 is integrally formed with the head lift body 42, the guide portion 47 is continuously applied with the upward pressing force along the rotation center axis of the lead screw 41, also.

Accordingly, the above backlash preventing mechanism 43 is capable of preventing backlash between the lead screw 41 and the head lift body 42 during movement following the rotation of the lead screw 41.

The head feeding mechanism 40 described above is insufficient in accuracy for feeding the head lift body 42 to the direction of the rotation axis of the lead screw 41 during movement following the rotation of the lead screw 41. This causes some trouble to impede the magnetic head 31 to accurately trace each track on the magnetic tape.

The reason is that the external thread of the lead screw 41, the tooth of the lead screw gear 44, and the internal thread 451 of the nut 45 are different from each other in shapes and accuracy. Accordingly, positioning of the magnetic head 31 moved cannot be performed at same spaces.

Recently, it has been attempted to increase a number of tracks for increase of storage capacity of data on a magnetic tape and it is, therefore, required to make tracks with narrow and same spaces between the tracks. Accordingly, it could not avoid that any off-track occurs because of some margin of error during reproducing data from the magnetic tape which records the data at same track spaces.

SUMMARY OF THE INVENTION

It is therefore an object of this invention to provide a head feeding mechanism, which is capable of simplification of a shape form in the feeding side of a magnetic tape and improvement of feeding accuracy thereof.

This invention relates to a head feeding mechanism (50) which is coupled with a magnetic head assembly (30) movable on a housing (12) in a linear direction and is adapted to move the magnetic head assembly (30) linearly in a guide axial direction of a guide bar (17) arranged on the housing (12). And the head feeding mechanism (50) has a screw center axis as a rotation center axis extending parallel in the guide axial direction of the guide bar (17). The head feeding mechanism (50) comprises a lead screw (51) provided with an external thread, a head lift body (52), and a backlash preventing mechanism (53).

The head lift body (52) has a through hole for receiving the lead screw (51) inserted therethrough and forms a hollow opening at its center, and has an integral structure formed by resin molding with a guide portion (57) for restricting the head lift body (52) from rotating around the rotation center axis and for moving linearly the head lift body (52) along the rotation center axis, and a bearing (55) to be engaged with the lead screw (51). And the head lift body (52) is fixed to the magnetic head assembly (30).

The above bearing (55) has an circular opening and a semi-circular opening and provides with a protrusion (551) characterized in this invention at one spot on surface of the internal wall. The protrusion (551) has a fingernail shape, is engaged with an external thread of the lead screw (51), is rubbing on and sliding up the external thread according to rotation of the lead screw (51), and then makes the lead screw (51) move linearly along the rotation center axis.

Figure 5:
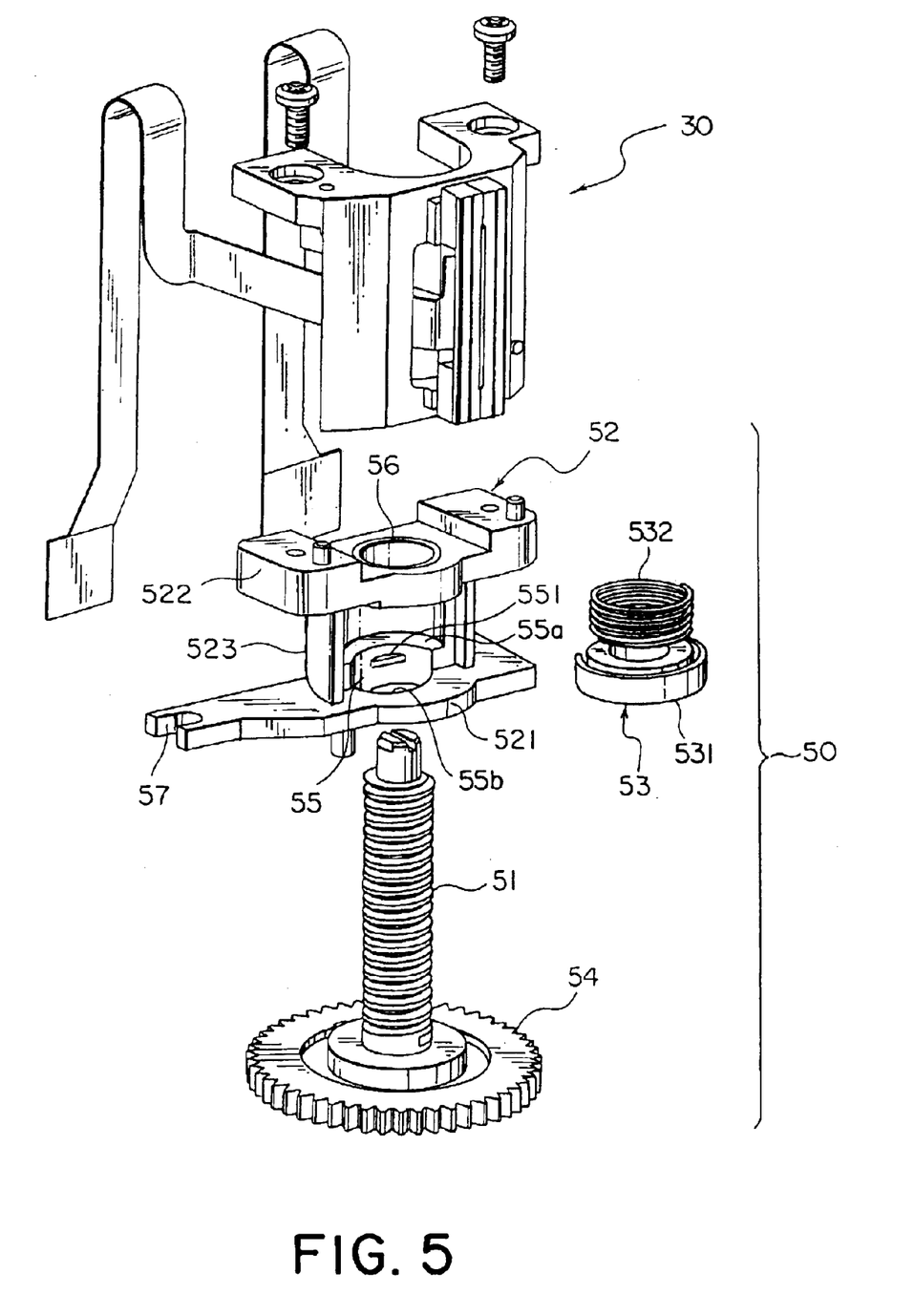
FIG. 5 is an exploded perspective view of the magnetic head actuator assembly according to an embodiment of this invention.

Also, it is preferable that the protrusion (551) is a small piece with a half-moon shape or a trapezoidal shape for engaging with an external thread of the lead screw (51) in the internal wall surface of the bearing (55). The protrusion (551) is provided in the semi-circular opening as shown in FIG. 5, but may alternatively be provided in the circular opening. In this case, the bearing (55) could be embedded in the head lift body (52).

It will readily be understood that the reference numerals enclosed in parentheses are affixed to facilitate understanding of this invention and no more than mere examples and that this invention is not restricted thereto.

As described above, the engaging mechanism of the lead screw and the head lift body is engaging only the fingernail shaped protrusion placed in a spot of the internal wall surface of the bearing portion of the head lift body with the external thread of the lead screw. And rotation moving is converted to linear moving. Accordingly, it is possible by the mechanism above described that accuracy of feeding quantity in the linear movement based on the rotation movement is unrelated to manufacturing accuracy of the bearing portion of the head lift body. As a result, not including the margin of error in the bearing portion of the head lift body, the margin of slippage error against equal feeding quantity depends on only screw accuracy of the lead screw. It is possible to raise the accuracy of feeding quantity.

Accordingly, it is possible to raise the accuracy of feeding quantity during linear movement of the lead screw along the rotation center axis thereof by rotation moving of the lead screw, engaging the protrusion with the external thread of the lead screw.

Moreover, the fingernail shape protrusion is formed into the integral structure by resin molding with the head lift body as the bearing. Accordingly, it is possible not only to improve manufacturing accuracy of the head lift body but to simplify manufacturing administration and to reduce manufacturing cost, also.

DESCRIPTION OF THE PREFERRED EMBODIMENTS

Now, a preferred embodiment of the present invention will be described with reference to the drawings.

FIG. 5 an exploded perspective view of the magnetic head actuator assembly (hereinafter may simply be called "actuator assembly") according to an embodiment of this invention, which is assembled as assembly 20 in the tape drive shown in FIG. 1. The actuator assembly comprises a magnetic head assembly 30 similar to the prior one shown in FIG. 2 and a head feeding mechanism 50 according to an embodiment of this invention. The head feeding mechanism 50 comprises a rotation portion and a linear movement portion.

The tape drive 10 for fitting a tape cartridge has been described above referring to FIG. 1 already. The magnetic head assembly 30 also has been described above referring to FIG. 2 already.

Figure 6:
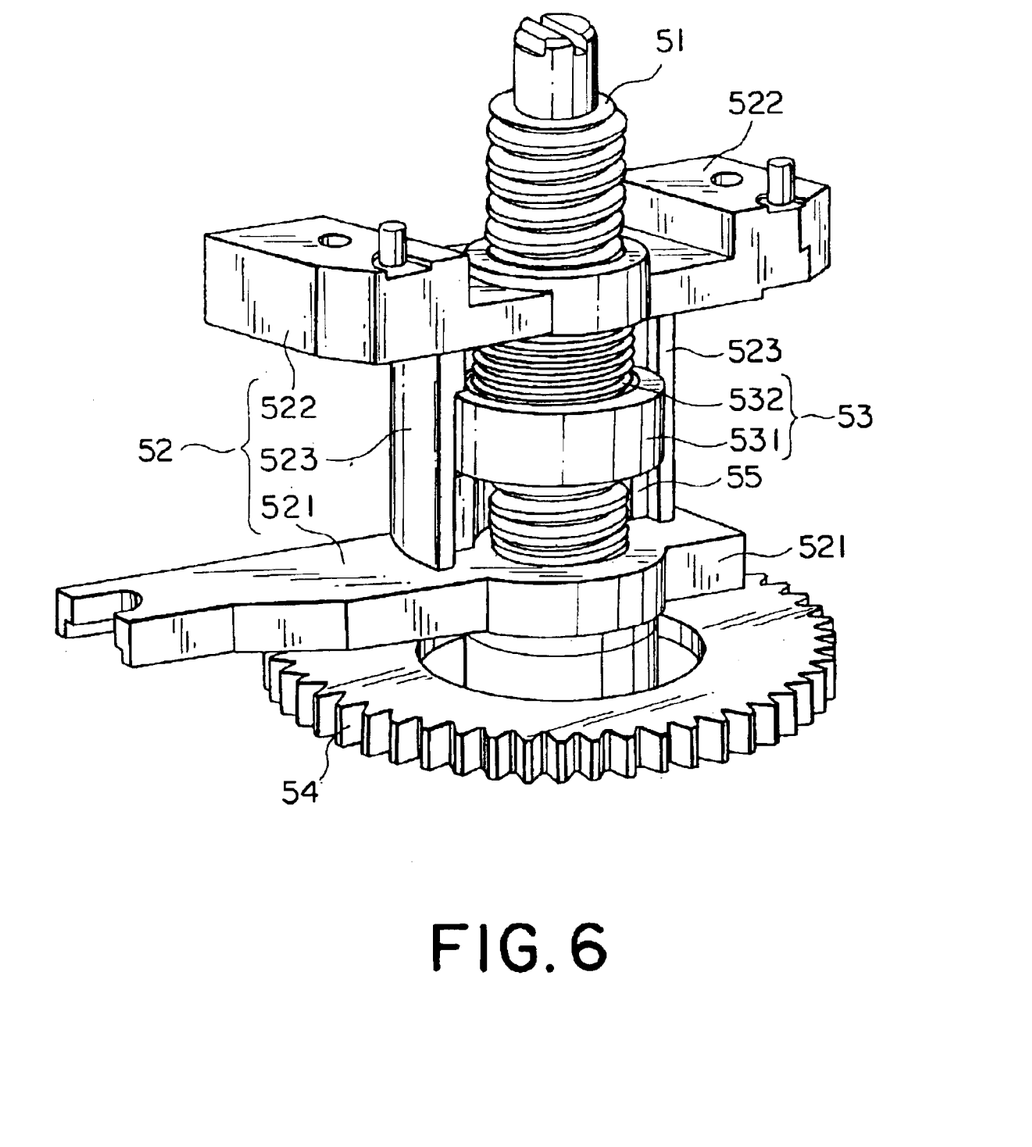
FIG. 6 is a perspective view of a head feeding mechanism, in an assembled state, illustrated in FIG. 5.
Figure 7:
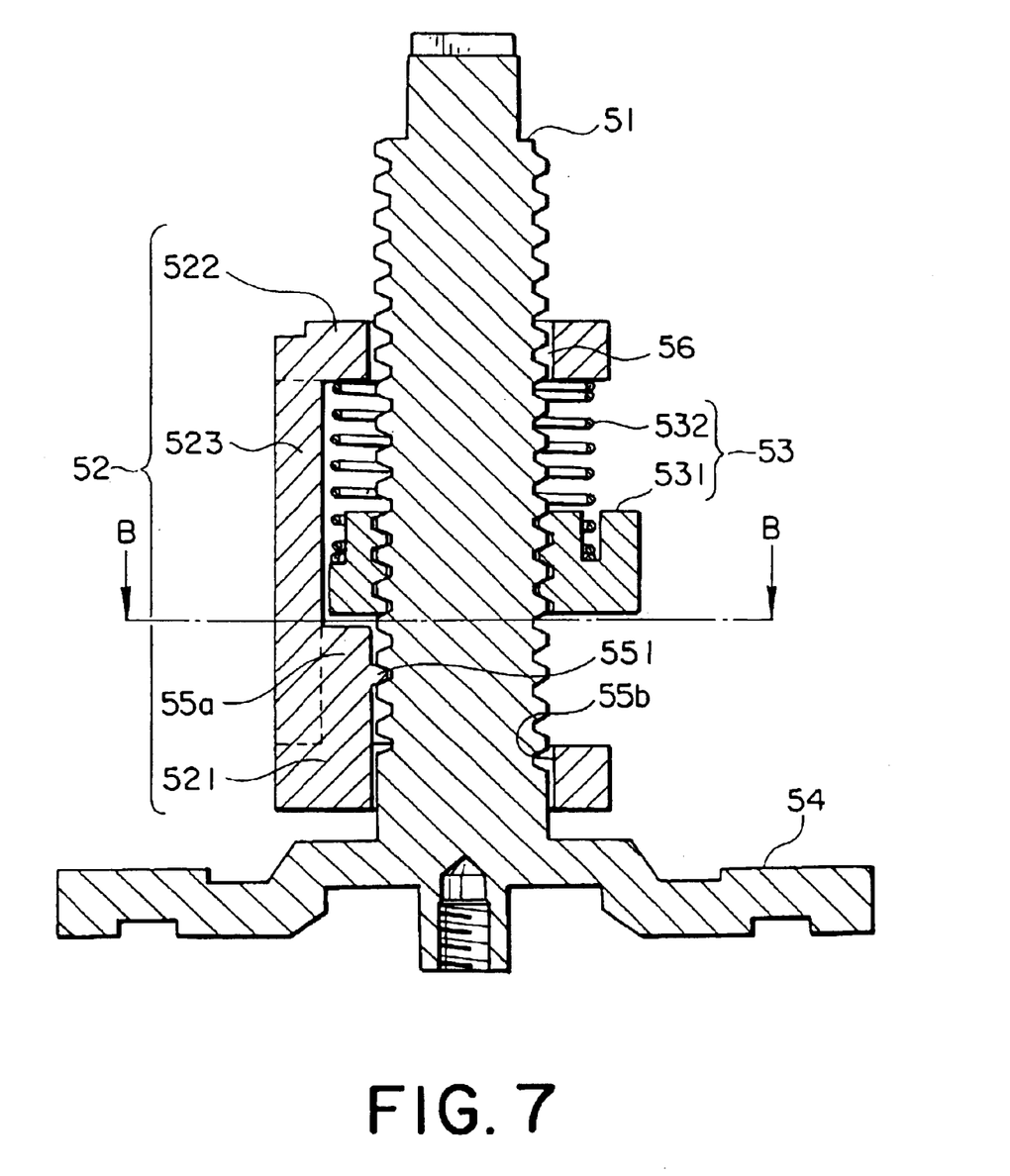
FIG. 7 is a sectional view of the head feeding mechanism illustrated in FIG. 6, taken along a line A—A in FIG. 1.

Referring to FIGS. 5 to 7, description will be made of the head feeding mechanism 50, below.

The rotary movement portion of the head feeding mechanism 50 comprises a lead screw 51 provided with an external thread and a screw central axis as a rotary central axis extending in a linear movement direction. The linear movement portion comprises a head lift body 52 moving up and down in the linear movement direction along the rotation central axis following the rotation of the lead screw 51 and a backlash preventing mechanism 53 for preventing backlash of the actuator assembly 20.

Figure 8:
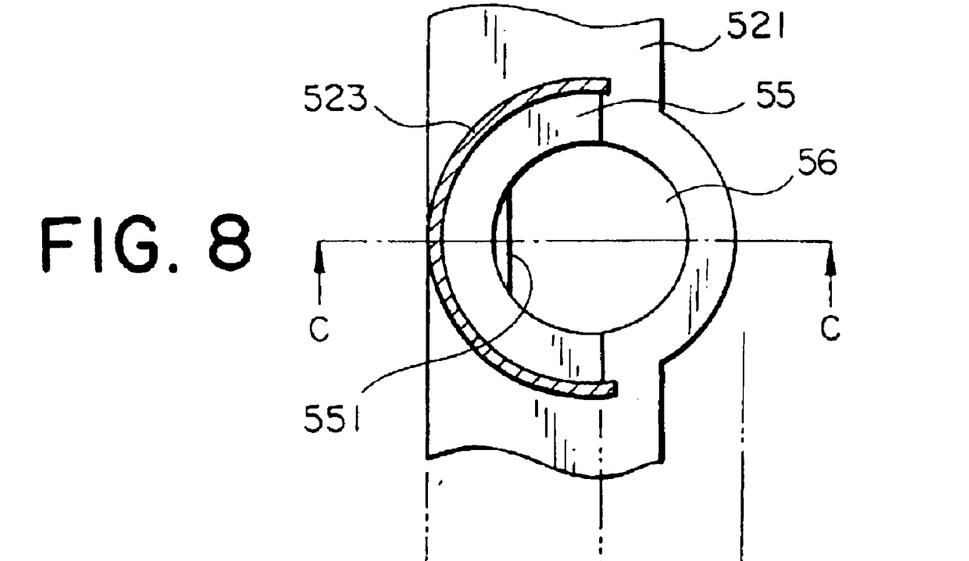
FIG. 8 is a sectional view taken along a line B—B in FIG. 7.

Difference point of this invention from the existing mechanism shown in FIGS. 2 to 4 exists in the head lift body 52 including a bearing portion 55 engaging with the external thread of the lead screw 51 and will later be described in detail referring to FIG. 8. The other components are the same as described referring to FIGS. 2 to 4.

The lead screw 51 is provided with a lead screw gear 54, which is attached to a lower end thereof for rotating the lead screw 51 around the rotation central axis by means of a drive machine, for example, a step motor or the like.

The head lift body 52 is a component according to this invention and comprises a base portion 521, a ceiling portion 522, and a semi-cylindrical portion 523, which are in an integral structure, preferably, into a single body formed by resin molding. The base portion 521 and the ceiling portion 522 extend in parallel to each other and in vertical to the linear movement direction. The semi-cylindrical portion 523 has an upright gutter-like shape as a half-split cylinder, which is taken by cutting a hollow cylinder by a plane along the center axis thereof, and connects between and supports the base portion 521 and the ceiling portion 522. Accordingly, the head lift body 52 has a generally "I" shape as seen from a lateral side. The head lift body 52 holds the magnetic head assembly 30 and moves linearly up and down together with the magnetic head assembly 30. In the head lift body 52, the backlash preventing mechanism 53 is arranged inside of the semi-cylindrical portion 523.

The backlash preventing mechanism 53 prevents backlash of the actuator assembly 20 as described above.

The lead screw gear 54 makes the lead screw 51 rotate along the rotation central axis by means of, for example, the step motor as described above. The rotation of the lead screw 51 around the rotation central axis thereof makes the head lift body 52 move in the linear movement direction coincident with the rotation center axis, in cooperation with the backlash preventing mechanism 53.

As described above, the head lift body 52 comprises the base portion 521 defining a lower end surface, the ceiling portion 522 defining an upper end surface, and the semi-cylindrical portion 523 with the hollow opening, and has an integral single body structure formed by resin molding. The base portion 521 has a bearing portion 55 (described later) and a guide portion 57, and the ceiling portion 522 has a plain or sliding bearing 56. The bearing portion 55, the sliding bearing 56, and the semi-cylindrical portion 523 are used for receiving the lead screw 51 inserted therethrough.

The base portion 521 is provided with the bearing portion 55, which comprises a half-cylindrical projection 55a coaxially disposed in the semi-cylindrical portion 523 and a circular opening 55b continuous to the half-cylindrical surface of the half-cylindrical projection 55a. The half-cylindrical projection 55a has a fingernail shaped protrusion 551 on its inner surface. The protrusion 551 engages the external thread of the lead screw 51 inserted through the bearing portion 55 and the plain bearing 56.

In the embodiment shown, the bearing portion 55 is illustrated to have the half-cylindrical projection extending on the upper-side of the base portion 521. This is convenient for burying the protrusion 551 onto the internal wall surface of the bearing 55. Alternatively, it is possible that the protrusion 551 may be buried on the inner wall of the circular opening 55b. In this case, the protrusion 551 may be formed to an integral structure with the base portion 521. Further, the bearing portion 55 may only be formed by the circular opening without formation of the half-cylindrical projection 55a.

One of the peaks of the base portion 521 laterally extends as an arm to the length longer than the other peak and has the guide portion 57 of a generally "U" shape at its end. The guide portion 57 is fitted and attached to the guide bar 17 illustrated in FIG. 1 so as to be slidable in the vertical direction. The guide portion 57 serves to prevent the rotation of the head lift body 52 around the rotation central axis of the lead screw 51.

The ceiling portion 522 has a pair of screw holes in its peaks engaged with the screws (not shown), respectively. By screwing the screws into the screw holes, the magnetic head assembly 30 is fixed to the head lift body 52.

The inner hollow portion of the semi-cylindrical portion 523 serves to receive the backlash preventing mechanism 53 comprising a pre-load bushing 531 and a pre-load spring 532.

In the backlash preventing mechanism 53, the pre-load bushing 531 comprises a cylindrical portion with an internal thread formed on its inside surface, an external annular receiving portion, and a semi-cylindrical wall portion. The external annular receiving portion extends radially outward at the lower end of the cylindrical portion to serve as a stopper for the pre-load spring 532. The semi-cylindrical wall portion extends upward from an outer periphery of the receiving portion in an area corresponding to a general half circle. Accordingly, a semi-annular gap is formed between the cylindrical portion and the semi-cylindrical wall portion.

As shown in FIG. 6, the pre-load spring 532 is partially received in the semi-annular gap and is disposed in a compressed state between the annular receiving portion of the pre-load bushing 531 and the lower surface of the ceiling portion 522 of the head lift body 52. Furthermore, both ends of the semi-cylindrical wall portion of the pre-load bushing 531 inhibit the rotation of the pre-load bushing 531 by engagement with edges of the semi-cylindrical portion 523 when the pre-load bushing 531 is mounted into the head feeding mechanism 50.

The pre-load spring 532 comprises a compression coil spring. By the pre-load spring 532, the pre-load bushing 531 is continuously applied with a downward pressing force along the rotation center axis of the lead screw 51 on one hand. On the other hand, the head lift body 52 is continuously applied with an upward pressing force along the rotation center axis of the lead screw 51. As the guide portion 57 is integrally formed with the head lift body 52, the guide portion 57 is continuously applied with the upward pressing force along the rotation center axis of the lead screw 51, also.

Next, referring to FIGS. 6 to 9, description will be made of the bearing portion 55 formed in a part of the head lift body 52 characterizing this invention.

As described above and shown in the figures, the bearing portion 55 with the fingernail shaped protrusion 551 is included in the base portion 521, which is formed in one body by resin molding together with the ceiling portion 522 and the semi-cylindrical portion 523. And the bearing portion 55 has the half-cylindrical projection 55a the circular opening 55b and receives the lead screw 51 inserted therethrough.

Figure 9:
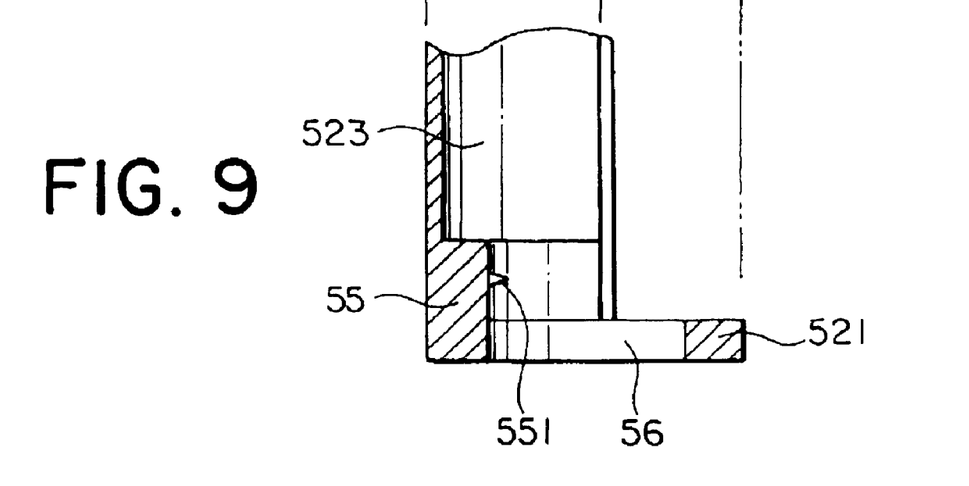
FIG. 9 is a sectional view taken along a line C—C in FIG. 8.

The protrusion 551 can be a pin like protrusion or a plate like protrusion, which projects from the internal wall surface of the half-cylindrical projection 55a toward the central axis of the bearing portion 55. The plate like protrusion 551 is formed in a half-moon shape or a trapezoidal shape having a linear edge at its projecting end and is disposed on the inner wall of the half-cylindrical projection 55a with an inclination equal to an inclined angle of the external thread of the lead screw 51 with respect to a plane perpendicular to the rotation axis of the lead screw 51. Thus, the half-moon shaped plate-like protrusion 551 can be engaged with the external thread of the lead screw 51 screwed through the plain bearing 56. Accordingly, it is possible for the fingernail shaped protrusion 551 to trace, rub on and slide up the external thread of the lead screw 51 following the rotation thereof, and then makes the head lift body 52 move linearly along the rotation center axis of the lead screw 51.

Namely, the above-described engaging structure between the lead screw 51 and the head lift body 52 converts the rotation movement of the lead screw 51 to the linear movement of the head lift body 52. In the structure, the external thread of the lead screw 51 engages with one protrusion 551 on the internal wall of the bearing portion 55 in the head lift body 52. Accordingly, manufacturing accuracy in the bearing portion 55 of the head lift body 52 is unnecessary but screw accuracy of the lead screw 51 is only necessary for insuring feeding accuracy of the head lift body 52.

Furthermore, the protrusion 551 can be formed into one integral body with the head lift body 52, the head feeding mechanism is simplified in the manufacture administration and is reduced in the manufacturing cost.

It is necessary for the fingernail shaped protrusion 551 to have strength as much as the fingernail shaped protrusion 551 endures loading of the head lift body 52 accompanied by rotation of the lead screw 51 and spring pressure of the backlash preventing mechanism 53.

Accordingly, if the protrusion could keep such strength, the protrusion can move the head lift body in the direction of rotation axis following the rotation of the lead screw engaging with the external thread of the lead screw. That is, the protrusion as keep such strength is not limited to the fingernail in the shape but can have another shape such as trapezoid.

The protrusion is not formed in one integral structure with the head lift body, but can be formed to a separated one and fixed to the internal wall of the bearing portion in the head lift body. In this case, it can strengthen more the protrusion by selecting the material and the shape thereof.

While the present invention has been described in detail in conjunction with the preferred embodiment thereof, the present invention is not limited to the foregoing description but can be modified in various manners without departing from the scope of the invention set forth in appended claims. For example, the components except above protrusion, such as semi-cylindrical portion of the head lift body may have any polygonal cylindrical shape as far as molding is possible or may comprise a plurality of columnar portions.

What is claimed is:

1. A head feeding mechanism for linearly moving a head assembly along guide bar arranged on a housing and extending in a linear movement direction of said magnetic head assembly, said head feeding mechanism comprising:

a lead screw having an external thread formed on an outer surface thereof and a screw center axis extending in parallel to said linear direction, said lead screw being rotatable around said screw center axis by a drive machine;

a head lift body for supporting said head assembly, which is mounted on the head lift body, and having a bearing portion for receiving said lead screw, which extends in the bearing portion; and a protrusion projecting from an internal wall surface of said bearing portion so as to engage with said external thread of said lead screw, such that said protrusion slides up and down alone said external thread following rotation of said lead screw, so as to move said head lift body linearly alone said screw center axis;

wherein said head lift body comprises:

a base portion comprising said bearing portion having said protrusion;

a ceiling portion extending in parallel with the base portion and comprising a ceiling side bearing portion receiving said lead screw, and a column portion connecting said base portion and said ceiling portion and comprising a hallow portion receiving said lead screw; and wherein said column portion comprises a semi-cylindrical portion partially surrounding said lead screw.

2. A head feeding mechanism as claimed in claim 1, wherein said protrusion comprises a plate protrusion, and said plate protrusion is disposed with an inclined angle equal to an inclination of the external thread of said lead screw with respect to a plane perpendicular to said screw central axis.

3. A head feeding mechanism as claimed in claim 2, wherein said plate protrusion is formed into a half-moon shaped plate having a linear edge at a projecting end thereof.

4. The head feeding mechanism as claimed in claim 1, wherein said protrusion is formed together with said bearing portion into a single body by resin molding.

5. The head feeding mechanism as claimed in claim 1, wherein said bearing portion formed in said base portion comprises (i) a half-cylindrical projection projecting from an upper surface of said base portion at a position on an interior side of said semi-cylindrical portion, (ii) and a circular opening formed an said base portion continuously from a half-cylindrical surface of said half-cylindrical projection.

6. The head feeding mechanism as claimed in claim 5, wherein said protrusion is disposed on an inner surface of said half-cylindrical projection.

7. The head feeding mechanism as claimed in claim 6, wherein said protrusion is embedded on the inner surface of said half-cylindrical projection.

8. The head feeding mechanism as claimed in claim 6, wherein said base portion, said ceiling portion and said semi-cylindrical portion are formed in a single body by resin molding.

9. The head feeding mechanism as claimed in claim 8, wherein said protrusion is formed integrally with said base portion.

* * * * *